United States Patent
Hnat et al.

(10) Patent No.: US 7,854,908 B2
(45) Date of Patent: Dec. 21, 2010

(54) METHOD AND APPARATUS FOR THE RECOVERY OF MOLYBDENUM FROM SPENT CATALYSTS

(76) Inventors: James G. Hnat, 3774 Lewis Rd., Collegeville, PA (US) 19426; Mark A. Schaffer, 415 Melchior Pl., Trappe, PA (US) 19426

( * ) Notice: Subject to any disclaimer, the term of this patent is extended or adjusted under 35 U.S.C. 154(b) by 79 days.

(21) Appl. No.: 12/195,042

(22) Filed: Aug. 20, 2008

(65) Prior Publication Data

US 2010/0047141 A1 Feb. 25, 2010

(51) Int. Cl.
*C01G 37/00* (2006.01)
(52) U.S. Cl. .......................... 423/59; 423/606
(58) Field of Classification Search .............. 423/1, 423/53, 59, 606
See application file for complete search history.

(56) References Cited

U.S. PATENT DOCUMENTS

| | | | | |
|---|---|---|---|---|
| 4,551,312 A | * | 11/1985 | Yuill | 423/53 |
| 4,552,749 A | * | 11/1985 | McHugh et al. | 423/606 |
| 6,153,155 A | * | 11/2000 | Wen et al. | 423/53 |
| 7,202,389 B1 | * | 4/2007 | Brem | 585/242 |
| 2009/0047198 A1 | * | 2/2009 | Thomas | 423/138 |

* cited by examiner

*Primary Examiner*—Stuart Hendrickson
*Assistant Examiner*—Richard M Rump
(74) *Attorney, Agent, or Firm*—Eckert Seamans Cherin & Mellott, LLC; Arnold B. Silverman, Esquire (57) ABSTRACT

This invention relates to an apparatus and process that utilizes high-temperature oxidation and sublimation techniques for the recovery of molybdenum from spent catalysts or other feedstocks that contain molybdenum. A preferred embodiment uses a counter-rotating vortex reactor and a cyclonic entrained-flow reactor to rapidly heat and oxidize the spent catalyst feedstock, such as carbon, sulfur, and molybdenum compounds, at temperatures in the range of about 2100° F. to 2900° F., resulting in a gas-solid stream containing molybdenum trioxide vapor. A high-temperature cyclone separator is utilized to separate the residue from this stream before this stream is rapidly quenched to a temperature sufficient to effect the condensation of solid molybdenum trioxide without condensing arsenic or phosphoric oxides. The condensed molybdenum trioxide material is separated from this stream by passing through a high-temperature filtration system. The remaining gaseous stream is then ducted to suitable unit operations for possible further material reclamation and entailed pollution control prior to its final discharge to the atmosphere.

21 Claims, 4 Drawing Sheets

METHOD AND APPARATUS FOR THE RECOVERY OF MOLYBDENUM FROM SPENT CATALYSTS

BACKGROUND OF THE INVENTION

1. Field of the Invention

This invention relates to the reclamation of molybdenum from spent catalyst materials, and more specifically, preferably relates to reclamation of molybdenum as molybdenum trioxide.

2. Description of the Prior Art

Spent catalyst materials typically consist of the original catalyst materials (commonly including compounds of molybdenum, tungsten, aluminum, cobalt, nickel, and sulfur) that have impaired catalytic activities due to contamination with materials, such as carbon, iron, vanadium, arsenic, silica, etc.

The value of the molybdenum contained within spent catalyst materials has made reclamation of molybdenum from these materials an important source of molybdenum, resulting in the development of a number of processes to recover this valuable commodity.

Many of these recovery processes, such as those described in U.S. Pat. Nos. 2,367,506; 3,773,890; 3,957,946; 4,046,852; 4,495,157; 5,702,500; 6,149,883; and 7,169,371; are based on the hydrometallurgical extraction of molybdenum, and are typically composed of a three-step process where:

The spent catalyst is roasted or partially gasified (to remove coke and hydrocarbons; typically under a wet atmosphere between 850° F. to 1650° F.) typically with an alkali salt to yield a soluble molybdenum compound. (This step is generally at atmospheric pressure, but can be performed at elevated pressures.)

The residue is extracted by liquid-solid leaching or digestion to dissolve molybdenum from the residue to form molybdenum-containing liquor.

The molybdenum is either precipitated or extracted from the molybdenum-containing liquor.

Subsequent steps in these processes are specific to the process and are largely dictated by the desired form of the final molybdenum product.

Other recovery processes utilize the carbothermal reduction of spent catalyst materials at elevated temperatures under a reducing atmosphere, such as described by U.S. Pat. No. 4,384,885, as well as smelting in an electric arc furnace, such as described by U.S. Pat. No. 4,349,381.

While some of these existing recovery processes have proven to be successful in the recovery of molybdenum, they may not be entirely satisfactory due to the expensive and/or large quantities of chemical reagents required to realize the recovery of the molybdenum. Likewise, these processes may also be hampered by the elaborate and costly processing equipment required to process large quantities of spent catalyst materials.

With the exception of the carbothermal reduction process, all of the previously mentioned processes are hampered by presence of carbon in the spent catalyst, which is present in significant quantities in most molybdenum-containing spent catalyst. The processes that are hampered by the presence of carbon all utilize techniques that remove the carbon that interferes with the winning of the molybdenum from the spent catalyst materials.

Another similar characteristic of the previously mentioned processes (especially the hydrometallurgical processes that focus on complete separation of molybdenum from other metal species) is how the presence of tungsten in spent catalyst materials can interfere with the recovery of molybdenum without tungsten contamination. This is due to molybdenum and tungsten, both being periodic Group 6 elements, having similar chemical potential, and the tendency to form heteropolymeric species within aqueous solutions. While processes and techniques that can affect the separation of tungsten or molybdenum from pregnant liquors exist (e.g., U.S. Pat. No. 3,969,478), the relatively low value of the tungsten can make this endeavor uneconomical.

The prior art of molybdenum reclamation also includes the reclamation of molybdenum from spent catalysts used to catalyze epoxidation reactions. These types of molybdenum containing catalysts are essentially liquid, organic residues composed mainly of alkylene glycols distilled from unreacted olefinic and organic hydroperoxide compounds. Reclamation of the molybdenum from these types of spent catalysts is detailed in U.S. Pat. Nos. 4,455,283 and 5,503,813. Since these spent catalyst materials typically contain significant amounts of alkalis, reclamation of molybdenum by the techniques described in this invention would be impractical (due to the alkali-induced slagging) unless the alkali materials had been removed from the spent epoxidation catalyst materials.

The prior art of molybdenum reclamation is often considered to include a variety of roasting processes where molybdenum-containing materials (usually molybdenum ores, such as molybdenite or other molybdenum disulfide-rich materials) are heated in a controlled, oxidizing atmosphere in an apparatus, such as a Herreshoff roasting furnace as described in U.S. Pat. No. 1,085,419, to affect the oxidation of the molybdenum sulfide, yielding molybdenum oxides (commonly the molybdenum dioxide, molybdenum trioxide, or some other suboxide with an average oxygen content that is between these oxide species). The sulfur is converted to sulfur dioxide vapor that exits the roaster while the resulting oxide residue is kept at temperatures below 1300° F. to prevent the fusion, melting, or partial sublimation of this material in the roaster. This type of molybdenum ore roasting process is described in U.S. Pat. Nos. 4,758,406 and 3,833,352 (with an interesting variation described in U.S. Pat. No. 4,552,749 that utilizes the molybdenum trioxide vapor as the oxidant for the molybdenum disulfide) and should not be considered as molybdenum reclamation processes, in a true sense, because these processes do not separate the molybdenum containing species from the other contaminants or gangue that may be coincident with the feedstock to these processes. For example, compounds of copper, tungsten, nickel, and silicon are common impurities in molybdenum ore roasting feedstocks, but these compounds are not removed from the molybdenum oxide product as a result of the roasting process.

The prior art of molybdenum reclamation may also be extended to consider processes where a feedstock that already contains molybdenum trioxide is heated in an atmosphere to affect the separation of the contained molybdenum trioxide as a vapor from the other constituents contained in the feedstock that remain in a condensed (i.e., non-vapor) phase. An example of such separation is demonstrated in U.S. Pat. No. 4,551,313, where an entrained flow of granular molybdic oxide-containing feedstock is mixed with a fuel gas and an oxidizing gas, with the entire mixture introduced into a furnace chamber. This gas/solid mixture is heated to a temperature between 2900° F. and 3200° F. in order to sublime the molybdenum trioxide and slag (i.e., melt) the remaining, impure fraction of the feedstock. The impurities from the feedstock are collected in a slag pool or flow into a slag pot, with the whole invention relying, in part, on the melting of slag-forming constituents in the feedstock to aid in the capture of non-volatile material that is suspended in the vapor stream.

Another prior art relating to the reclamation of molybdenum incorporates the oxidation of molybdic sulfide materials (especially ores, such as molybdenite) along with subsequent sublimation of the produced molybdenum trioxide at elevated temperatures. Examples of processes that employ of this type of reclamation are demonstrated by several United States patents, i.e., U.S. Pat. Nos. 1,426,602; 3,139,326; and 4,555,387.

In U.S. Pat. No. 1,426,602, Robertson describes a process and apparatus for the oxidation of molybdenite, followed by the sublimation of molybdenum oxide in a circulating gas circuit which cyclically heats the molybdenum oxide and subsequently cools the gas for condensation in various points along the circuit. No operating temperatures are cited in the patent, and the practicality of the invention is questionable, since the deposition of solid molybdenum oxides along various points in the circuit will likely result in the fouling and blockage of the circuit.

U.S. Pat. No. 3,139,326 discloses finely divided molybdenite is oxidized and sublimed in a conventional box furnace operating at temperatures of at least 1800° F. and then quenched to 2200° F. as it exits the furnace. Separation of the residues from the molybdenum oxide vapor is accomplished with a series of ceramic baffles within the furnace and by subsequent filtration of the molybdenum trioxide vapor by a ceramic-fiber filter assembly. As a consequence of choosing to filter the molybdenum trioxide in its vapor state, both a maximum and minimum operating temperature constraints are imposed on the filtering of this vapor stream. First, there is the maximum operating temperature limitation that is imparted by the ceramic filter media since even the most refractory of filter media do not commonly operate at temperatures in excess of 2200° F. Second, a minimum operating temperature is imparted by the thermophysical properties of molybdenum trioxide, requiring that temperatures of the vapor stream be sufficiently high to prevent the deposition of the molybdenum trioxide on the filter media. Since this particular furnace design operates at or near atmospheric pressure, a temperature of at least 1800° F. must be maintained to prevent all but the most dilute vapor streams of molybdenum trioxide from condensing. Thus, the operating window of this filter assembly is restricted to 1800° F. to 2200° F. In other embodiments of this invention, the molybdenum trioxide vapor stream is to be filtered at 1350° F. to affect the separation from the nonvolatile compounds. While this is possible, this low temperature imparts significant limitations on the maximum volume fraction of the molybdenum trioxide in the vapor phase since the vapor pressure of molybdenum trioxide at 1350° F. is only on the order of 0.001 atmospheres. Maintaining such low concentrations of molybdenum trioxide in the vapor stream seriously impacts the operating efficiencies and intensities of this process.

In U.S. Pat. No. 4,555,387, the process is essentially the same as that described in an earlier patent by the same inventors (U.S. Pat. No. 4,551,313), referenced above, as a process for the simple purification of molybdenum trioxide. In these more recent embodiments of their invention the only difference is that the molybdenum trioxide feedstock is replaced with a feedstock composed of a molybdenum sulfide concentrate. In this invention, as before, an entrained flow of granular material (now a molybdenum sulfide-containing feedstock) is mixed with a fuel gas and an oxidizing gas, with the entire mixture introduced into a furnace chamber. This gas/solid mixture is heated to a temperature somewhere between 2900° F. and 3200° F. in order to sublime the molybdenum trioxide and slag (i.e., melt) the remaining, impure fraction of the feedstock. The impurities from the feedstock are collected in a slag pool or flow into a slag pot, with the whole invention relying, in part, on the melting of slag-forming constituents in the feedstock to aid in the capture of non-volatile material that is suspended in the vapor stream.

The present invention overcomes many of the complications and disadvantages of the prior art in molybdenum recovery processes by providing a relatively simple, efficient, and intensive (i.e., high throughput to reactor area ratio) process that relies on the thermophysical properties of molybdenum trioxide, and is unaffected by the interference of carbon and tungsten that may be present in spent catalyst materials.

SUMMARY OF THE INVENTION

This invention provides a method for the recovery of molybdenum (as molybdenum trioxide) from spent catalyst materials (feedstock), whereby the feedstock may contain various concentrations of hydrocarbons, carbon, sulfur, phosphorous, iron, arsenic, and vanadium species contained on/in the feedstock as well as $Al_2O_3/SiO_2$ comprising the catalyst substrate and various amounts of nickel, cobalt, tungsten and molybdenum comprising the catalytic agent, whereas the concentrations of the catalyst constituents depend on the specific spent catalysts being processed. The spent catalyst materials may also include catalyst fines (catalyst materials that have size distributions that are not suitable for utilization in catalyst beds), as well as other materials that contain molybdenum that can be reclaimed by high-temperature oxidation and sublimation techniques. This invention exploits the relatively low temperature required to liberate molybdenum trioxide vapor (which has a vapor pressure of approximately 1 atmosphere at 2104° F.) from the bulk of the metal species contained within the spent catalyst.

The process first heats and oxidizes the spent catalysts in an entrained-flow reactor at sufficiently high temperature and in an oxidizing atmosphere to sublime the molybdenum trioxide formed (from the oxidation of the molybdenum species) or already present in the feedstock. Second, the gas-solid stream from the entrained-flow reactor is passed through a high-temperature cyclone separator that separates the remaining non-volatile materials, yielding an alumina- and/or silica-rich product, from the remaining gaseous stream that now contains molybdenum trioxide vapor. Third, the essentially particulate-free gaseous stream is rapidly quenched to cause the condensation of the contained molybdenum trioxide vapor. Fourth, the gaseous stream with the entrained molybdenum trioxide solids is passed through a high-temperature filter, yielding the molybdenum product and a particulate-free, gaseous stream. Finally, the particulate-free, gaseous stream is ducted to suitable unit operations for further material reclamation and pollution control prior to its final discharge to the atmosphere. The process provides the means of forming two (2) primary products: (1) an alumina-rich or silica-rich granular product (Product 1), and (2) a powder containing up to ca. 90% molybdenum trioxide (Product 2).

According to another aspect of the invention, the process comprises the steps of (1) comminuting the feedstock to a size distribution suitable for the rapid heating and oxidation of the comminuted material in an entrained-flow reactor; (2) fully oxidizing and simultaneously heating the feedstock to a temperature of about 2100° F. to 2900° F. within the entrained-flow reactor with a preferred gas residence time greater than 100 milliseconds, thus forming water vapor, carbon dioxide vapor, sulfur dioxide vapor, molybdenum trioxide vapor, and other volatile species, such as phosphorus pentoxide vapor and arsenic trioxide vapor, as well as entrained, non-volatile matter, such as alumina, silica, nickel oxides, cobalt oxides, tungsten oxides, and in some cases vanadium oxides; (3) separating the gas phase species in a high temperature cyclone with an operating temperature of about 2100° F. to 2900° F. from the non-volatile solid residues with the resultant formation of an alumina or silica rich product; (4) quenching the gas vapor exiting the high temperature cyclone to a temperature of about 1000° F. to 1200° F., with the resultant formation of a molybdenum trioxide powder; (5) collection of the molybdenum trioxide powder in a high-temperature particulate filter with an operating temperature of about 1000° F. to 1200° F.; (6) passing of the remaining gas phase species, such as carbon dioxide, water, sulfur dioxide, phosphorus pentoxide, and arsenic trioxide vapors, through the high temperature particulate filter for subsequent quenching and scrubbing of the gases in conventional pollution control unit operations.

In another embodiment of the invention, the entrained flow reactor assembly includes a vertically oriented counter-rotating vortex entrained flow reactor followed by a horizontal cyclone entrained flow reactor. The horizontal cyclone reactor is then connected to a vertically-oriented, high-temperature, cyclone separator.

A further embodiment of the invention includes the addition a residence chamber below a preferably vertically oriented cyclone separator to allow additional residence time for molybdenum species oxidation and sublimation from the separated solid residue material. The residence chamber is thermally insulated to retain the heat of the solid residue exiting the cyclone separator and is connected to the cyclone separator in such a manner as to allow an exchange of gases between the two reactor assemblies so as to allow for additional molybdenum trioxide vapor evolved from the residence chamber to exit through or near the cyclone separator exit. The operating temperature of the residence chamber is preferably in the range of 2100° F. to 2900° F. The preferred residence time of the residue solids within the residence chamber is greater than 1 minute.

The invention neither requires nor relies on the filtering (i.e., passage of a vapor through a porous media) of the molybdenum trioxide vapor to affect the separation of the molybdenum trioxide from other condensed species entrained in the same stream. Likewise, the present invention does not rely on heating the feedstock materials to temperatures in excess of 2900° F. in order to affect the slagging or melting of the non-molybdenum trioxide species in order to affect the separation of the non-vapor phase materials from the molybdenum trioxide fraction of a process stream.

As part of this invention, an apparatus is described that accomplishes the unit operations that comprise the majority of the process described in this invention.

It is an object of the present invention to provide a method and related apparatus for the recovery of molybdenum from feedstock, which may be spent catalyst materials.

It is a further object of the present invention to provide for an efficient, reliable means of recovering molybdenum as molybdenum trioxide from spent catalyst materials.

It is another object of the present invention to provide apparatus for sequentially processing of the spent catalyst materials in an economical and efficient manner to recover molybdenum.

These and other objects of the present invention will be more fully understood in the following detailed description of the invention on reference to the illustrations appended hereto.

DETAILED DESCRIPTION OF THE PREFERRED EMBODIMENTS

Figure 1:
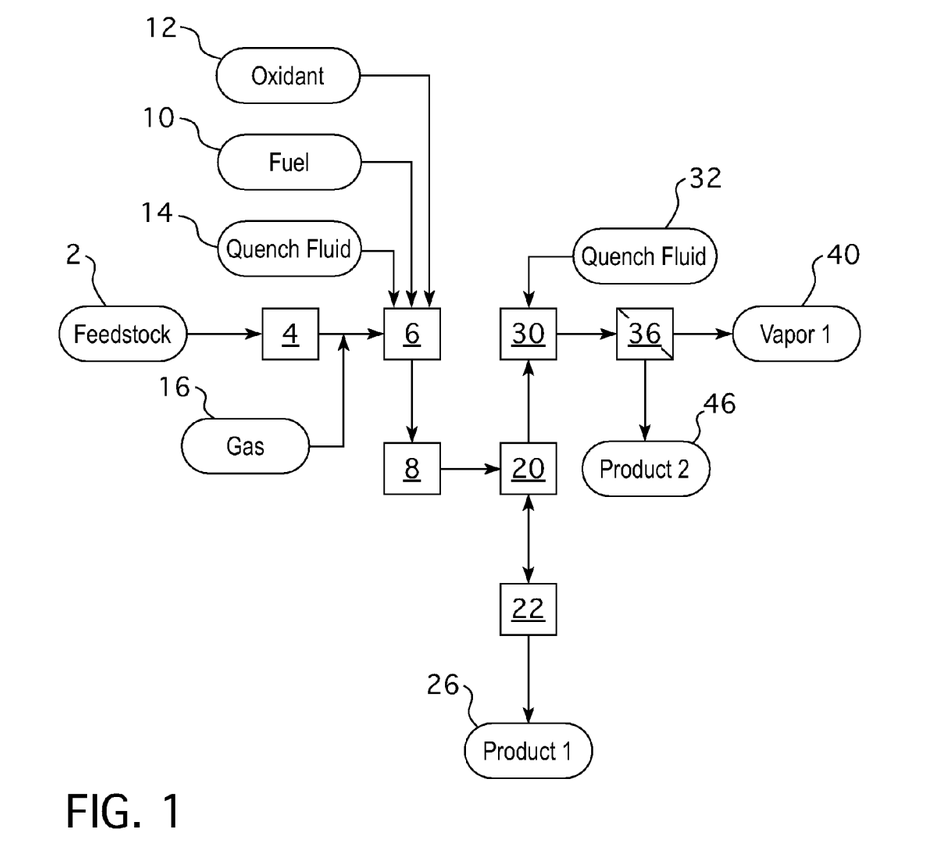
FIG. 1 is a process flow diagram showing a preferred process sequence of the present invention.
Figure 2:
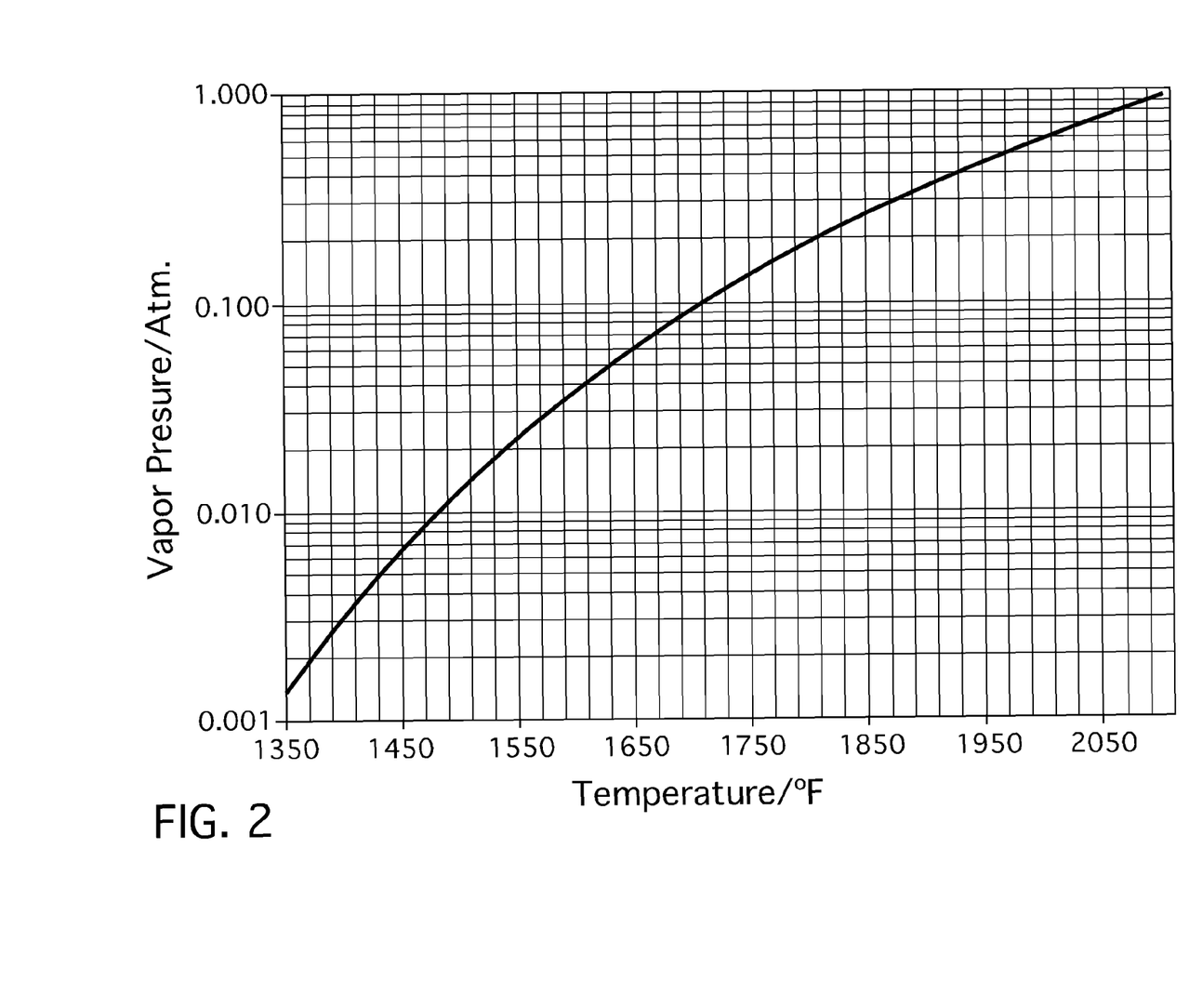
FIG. 2 is a graph showing a plot of vapor pressure of molybdenum trioxide versus the temperature range.

An embodiment of the process of the present invention for the recovery of molybdenum from feedstock, such as spent catalysts, is presented in FIG. 1. The process begins with the delivery of feedstock materials 2, preferably spent catalyst materials, such as is utilized in petroleum processing operations as hydrotreating, hydrodesulfurization, and hydrodenitrification, or other materials that contain molybdenum that can be reclaimed by high-temperature oxidation and sublimation techniques, to a comminution system 4. Among the preferred feedstocks for use in the present invention are at least one of the materials selected from the group consisting of molybdenum-containing ores and molybdenum-containing ore concentrates with the most preferred such ores or ore concentrates being selected from the group consisting of molybdenite, scheelite, powellite, tungstenite, and wolframite-containing molybednum disulfide or molybdenum oxides. The comminution system 4 reduces the size of the feedstock materials to a size suitable for the rapid oxidation and rapid heating in an entrained-flow reactor assembly 6, 8. A preferred average size of the feedstock materials is about 300 microns with minimal amounts of comminuted material less than 40 microns; however, it may be possible to use a larger average size comminuted feedstock or even un-comminuted feedstocks. The comminuted feedstock is then delivered by pneumatic transport using a transport gas 16 or other suitable transport means to said entrained-flow reactor assembly. Oxidant 12 and fuel 10 are added to said entrained-flow reactor assembly to create a high temperature oxidizing environment within the entrained-flow reactor assembly. A preferred oxidant is one selected from the group consisting of oxygen-enriched air and high-purity oxygen. Depending on the carbon and sulfur content of the spent catalysts, quench fluids 14 (with or without atomization) may be added to the process to limit the maximum operating temperature of the entrained reactor assembly. The purpose of the entrained-flow reactor assembly 6, 8 is to rapidly heat and oxidize any residual carbon and sulfur residing on/in the spent catalysts and to fully oxidize the molybdenum and/or the molybdenum sub-oxides residing in/on the spent catalysts to yield molybdenum trioxide. As depicted in FIG. 2, the vapor pressure of molybdenum trioxide is insignificant at temperatures below 1350° F. (ca. 0.001 atmospheres). At temperatures in excess of 2100° F., molybdenum trioxide exhibits a vapor pressure of approximately one atmosphere, resulting in significant sublimation rates at the pressure and temperature within the entrained-flow reactor assembly. A preferred operating temperature of the entrained-flow reactor assembly is in the range of about 2100° F.-2900° F. At these operating temperatures, pressures, and under an oxidizing atmosphere, the oxides of phosphorus, arsenic, and sulfur are expected to be in the vapor phase. A preferred gas residence time within the entrained-flow reactor assembly is about 100 milliseconds or greater.

A preferred configuration of the entrained-flow reactor assembly consists of a counter-rotating vortex (CRV) reactor 6 followed by a cyclone reactor 8. The counter-rotating vortex reactor consists of a highly turbulent, well stirred gas/solids reaction zone followed by a gas/solids plug flow reaction zone. The gas/solids exiting the CRV reactor 6 enters a horizontal cyclone reactor 8 where additional oxidation of the feedstock and sublimation of the molybdenum trioxide occurs. The gas/solids suspension exiting the entrained-flow reactor assembly 6, 8 then enters a high-temperature cyclone separator 20 where the residual solids are separated from the high temperature gases. The residual solids consist primarily of the alumina or silica catalyst substrate with smaller amounts of nickel or cobalt or tungsten oxides with some residual molybdenum oxides. The residual solids enter a residence chamber 22 that is maintained at a temperature of about 2100° F. to 2900° F. so as to provide additional sublimation of the residual molybdenum trioxide. The cyclone separator 20 and the residence chamber 22 are connected in such a manner so as to allow an exchange of high temperature oxidizing gases. The additional molybdenum trioxide sublimation that occurs within the residence chamber 22 migrates through this same connection to the cyclone separator 20, where it combines with the gas flow in the cyclone separator and vents as part of the high-temperature gaseous stream exiting the cyclone separator of about 2100° F. to 2900° F. A preferred residence time of the solids in the residence chamber for removal of most of the residual $MoO_3$ is greater than 1 minute. The first product 26 formed (Product 1), exits the residence chamber 22 via a high temperature solids removal system. Product 1 typically consists of the alumina and/or silica, with a combination of nickel oxides, cobalt oxides, tungsten oxides, or combinations thereof, depending on the type of spent catalysts being processed. Trace amounts of other oxides species, including those of calcium, iron, magnesium, sodium, potassium, and vanadium, as well as other oxide species, depending on the specific composition of the spent catalyst material being processed, may also appear in Product 1. Product 1 will typically be a dry granular material for vanadium oxide concentrations less than 2-3%. This is typically the case for spent catalysts obtained from fixed-bed hydrotreating reactors used for the processing of low vanadium content petroleum streams. Spent catalysts obtained from the hydrotreating of tar sands and other high vanadium content oil based materials can have vanadium concentrations greater than 10%. Spent catalysts obtained from these oil refining operations can result in Product 1 being in the form of a molten slag material.

The current invention relates to operation without slagging the feedstock or the residual material after oxidizing and subliming. However, with suitable modifications and adjustments to operating procedures and temperatures, the process could also accommodate operation in a slagging mode. To accommodate such a slagging operation, it is necessary that the high-temperature reactor vessels operate at temperatures that are greater than the slagging temperature of the oxidized feedstock.

The high temperature gases leaving the high temperature cyclone separator 20 typically consists of vapors of molybdenum trioxide, phosphorus pentoxide, arsenic trioxide, sulfur dioxide, carbon dioxide, water, oxygen, and nitrogen, with small amounts of suspended solids that were not separated in the high-temperature cyclone separator 20. The nickel, cobalt and tungsten oxides formed in the process as well as the alumina and silica substrate materials are refractory in nature and exhibit extremely low vapor pressures at temperatures less than 2900° F. Therefore, these entrained, residual materials entering in the gas/solids suspension are effectively separated from the molybdenum trioxide and other vapor species exiting the cyclone separator 20. The high temperature gas stream exits the cyclone separator 20 at a temperature in the range of about 2100° F. to 2900° F. and is rapidly cooled to about 1000° F. to 1350° F. in a gas quench assembly 30 via the addition of a quench fluid 32, with or without atomization. The quench fluid 32 is preferably water, atomized with air, oxygen, or a combination of these fluids. The rapid cooling of the vapors is necessary for the formation of a dry, unconsolidated powder that avoids the formation of molten droplets that could potentially adhere to the inside surfaces of the quench assembly or the interconnecting ductwork between vessels.

The quenched gas forms a dry molybdenum trioxide powder that is collected in a high-temperature filter assembly 36, while the sulfur dioxide, phosphorus pentoxide, and arsenic trioxide species along with the carbon dioxide, water, oxygen, and nitrogen vapors pass through the high-temperature filter assembly 36 to form the Vapor 1 stream 40 and are subsequently filtered or scrubbed using conventional techniques.

The molybdenum trioxide rich powder 46 (Product 2) exiting the high-temperature filter assembly 36 will typically have purities ranging from about 75% to 90% depending on the molybdenum content of the feedstock 2, the amount of molybdenum sublimed from feedstock, and the separation efficiency of the cyclone separator 20. Means are provided for removing the molybdenum trioxide rich powder 46 (Product 2). Product 2 will consist primarily of molybdenum trioxide with smaller amounts of alumina, silica, and trace amounts of the oxides of calcium, potassium, sodium and iron. Trace amounts of nickel, cobalt and tungsten oxides may also appear in Product 2 (stream 46), depending on the type of spent catalyst being processed.

Figure 3:
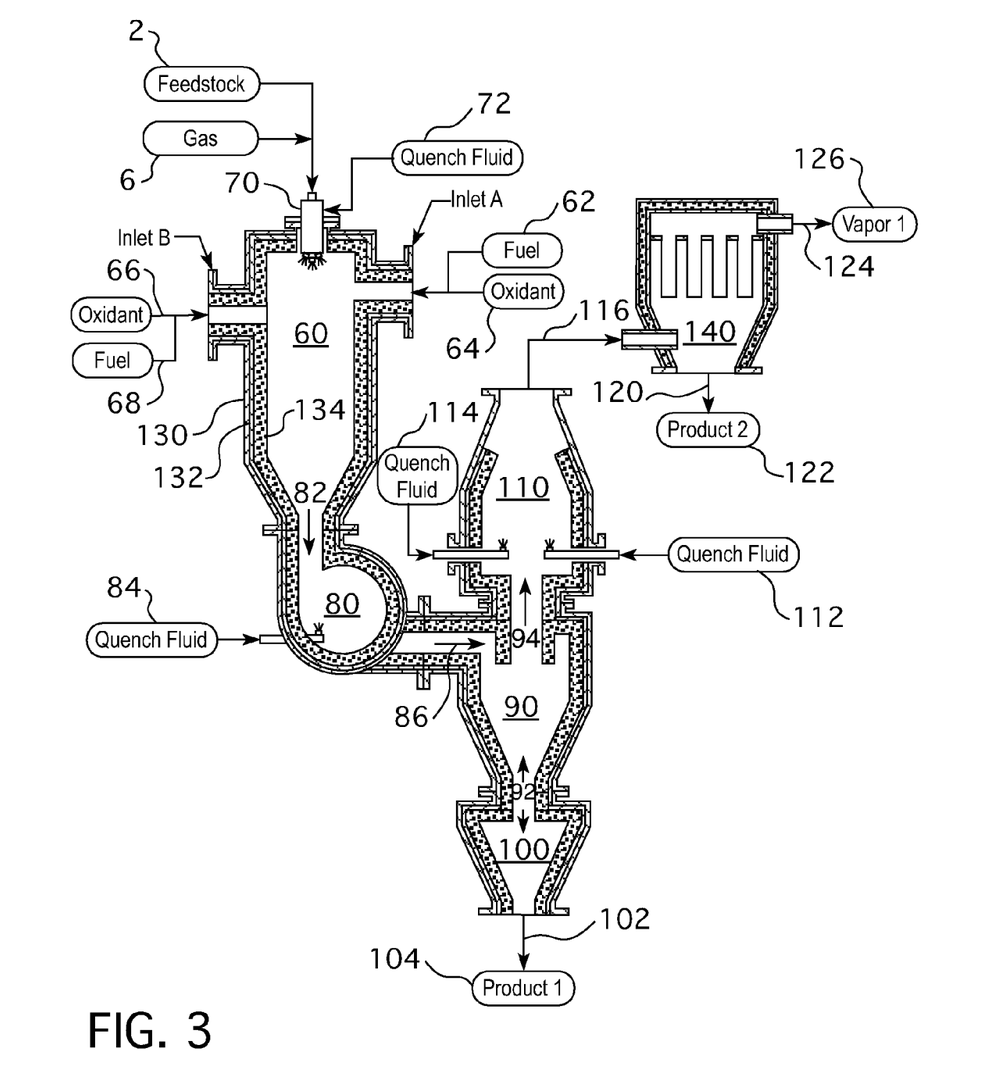
FIG. 3 is a schematic illustration showing a form of apparatus usable in the present invention.

The apparatus that comprises part of the preferred embodiment of this invention is described hereafter and is depicted in FIG. 3.

First, the entrained-flow reactor assembly is comprised of two reactor vessels. Vessel 60 is a counter-rotating reactor assembly that has two inlets for fuel and oxidant streams via the "inlet arms" that receive the two fuel and oxidant streams influent to the process (streams 62, 64, 66, 68). These inlet arm streams create two counter-rotating flows with the net effect being a highly-turbulent, well-stirred gas region within the vessel. The feedstock is conveyed into the vessel at the top (combined streams 2 and 6), through an injector assembly 70 at the top of the vessel aligned with the vessel's vertical axis. The quench fluid (stream 72) is also introduced, via the same injector assembly in the preferred embodiment, in an annular area around the influent feedstock stream. These influent streams through the injector assembly are introduced to the highly-turbulent, well-stirred gas region where the hot combustion products initiate and sustain combustion of the influent materials as they travel through the lower, plug-flow region of the vessel. Ultimately, the material is forced to converge by a nozzle, where the stream 82 is exhausted from reactor Vessel 60 to enter Vessel 80 (stream 82). Vessel 80 is preferably a horizontally-oriented cyclone reactor that provides extended residence time to the reacting material flow so that oxidation and sublimation of the entrained feedstock materials can continue. The influent stream (stream 82) is introduced tangentially to the horizontal cyclone at one end, and the effluent stream (stream 86) is tangentially exhausted from the opposite end of the horizontal cyclone. A quench fluid (stream 84) is introduced via an injector assembly at the inlet end of the cyclone reactor. A particularly preferred version of the entrained-flow reactor assemblies (i.e., both Vessel 60 and Vessel 80) are collectively described in great detail by Hnat in U.S. Pat. No. 4,957,527 ("Method and Apparatus for Heat Processing Glass Batch Materials"), the disclosure of which is herein incorporated by reference. In Hnat's apparatus, the "suspension-type preheater chamber" (Item 100 from FIG. 1 in Hnat's invention) corresponds to the present invention's Vessel 60; likewise, Hnat's "cyclone melting chamber" (Item 200 from FIG. 1 in Hnat's invention) corresponds to this invention's Vessel 80. While the function of Vessel 60 is essentially the same as Hnat's suspension-type preheater chamber (a well-stirred, plug flow suspension preheater that enhances the convective heat transfer to suspended/entrained particulate matter and provides combustion/oxidation stabilization within vessel), the function of Vessel 80 (a chamber for providing extended residence time at temperature required for the diffusion-limited gas-solid reactions to complete) departs significantly from its analog in Hnat's cyclone melting chamber (where separation, dispersion, mixing and melting of glass-forming precursors occurs).

Second, the vapor and residue is separated in two interconnected vessels. Vessel 90 is the high-temperature cyclone separator that affects the separation of the vapor components from the residues entrained in Stream 86. The exhaust from Vessel 80 (Stream 86) enters the high-temperature cyclone separator (as depicted in its preferred, vertical orientation in FIG. 3). Stream 86 is received at the inlet head of the cyclone separator through an aperture that is either a straight tangent, or a volute-type transition (the preferred embodiment), to the tangent of the cross-section of the vessel, perpendicular to its vertical axis, as it typical of classic cyclonic, reverse flow, cylinder-on-cone, gas-solid separators or classifiers. As the stream is injected into the separation space in the cylinder, swirling motion is created. This stream flows downward, along the inside face of the vessel (forming the outer vortex), until it ultimately turns upward, and flows through the center of the outer vortex (forming the inner vortex). The downward, centrifugal motion of the swirling gas collects and transports materials denser than the bulk gaseous flow (essentially the entrained, particulate fraction of the influent stream) toward the bottom of the cyclone's cone (in the preferred orientation of the apparatus) where it falls into the residence chamber (Stream 92), below, with the aid of gravity and side wall boundary layer gas flows. Meanwhile, the swirling gas flow of the inner vortex exits through the top of the cyclone's cylindrical section (Stream 94). Vessel 100 is the residence chamber where separated residues from the cyclone separator accumulate. The residence chamber provides additional dwell time at elevated temperature under an atmosphere that is freely exchanged with the vapor in the cyclone above. Separated residue materials that may not have been sufficiently heated or may have compositions that prevent efficient oxidation or sublimation are allowed to reside in this chamber for time periods in excess of the residence time experienced in the entrained-flow reactors. Any sublimed molybdenum trioxide that evolves from the residue materials at this point are free to exchange with the swirling vapor in the cyclone separator, and ultimately into the evaporative cooler via Stream 94. In order to prevent the accumulation of excessive amounts of residue in the residence chamber, the contained residue materials are discharged periodically via a high-temperature rotary airlock, or, as the preferred embodiment, through a high-temperature "double-dump" type flapper valve system. Stream 102 represents the discharged material (residual, non-volatile or unreacted material from the feedstock) is designated as Product 1 (104).

Third, the vapor stream discharged from the high-temperature cyclone separator 90 (Stream 94) is rapidly quenched in the evaporative cooler (Vessel 110) to affect the deposition of molybdenum trioxide as a fine powder. A quench fluid (the preferred embodiment being water) is atomized (either through direct atomization or with the preferred embodiment being atomized with an auxiliary stream of compressed gas) and introduced into the evaporative cooler (as Streams 114, 112) to contact the contents of Stream 94. From one to four spray lances are employed to deliver the atomized quench fluid into the evaporative cooler, with the flow of the quench fluid being modulated to control the temperature of the vapor and particulate exiting the vessel as Stream 116.

Finally, the gas-solid stream discharged from the evaporative cooler (Stream 116) is ducted into a high-temperature separation assembly (essentially an insulated, high-temperature baghouse apparatus) to effect the separation of the condensed phase from the vapor phase by simple filtration or sieving. The preferred embodiments of the separation media are twofold, and include filtration via porous, ceramic elements, or sieving via woven metal mesh. The residual fraction (essentially the condensed molybdenum trioxide) that is collected from Stream 116 is periodically discharged from the high-temperature separation assembly as Stream 120, and is designated Product 2 (122). The remaining vapor phase from Stream 116 is continuously discharged from the high-temperature separation assembly as Stream 124, and is designated as Vapor 1 (126). This vapor is subsequently treated and continuously discharged as the gaseous process effluent stream.

The preferred embodiment of the construction of Vessels 60 through 110 consists of sealed, flanged, metal vessels, such as depicted at 130, with an insulation layer, such as depicted at 132, and refractory linings, such as depicted at 134, sufficient to withstand the preferred temperatures of the unit operations performed within and protect the exterior metal, vessel walls. The vessels, with their attached appurtenances, are machined and constructed with sufficient tolerances and strength to withstand continuous operation with contained pressures up to one atmosphere above ambient pressure. The preferred material for construction for the vessel walls is either mild steel (with a water-cooled jacket) or alloy steel, such as AISI alloy 304 stainless steel (either with or without a water-cooled jacket).

Figure 4A:
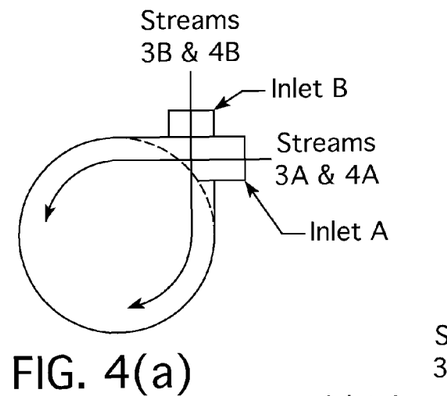
FIGS. 4(a)-4(c) show several embodiments of the fuel and oxidant inlets to the entrained-flow reactor.
Figure 4B:
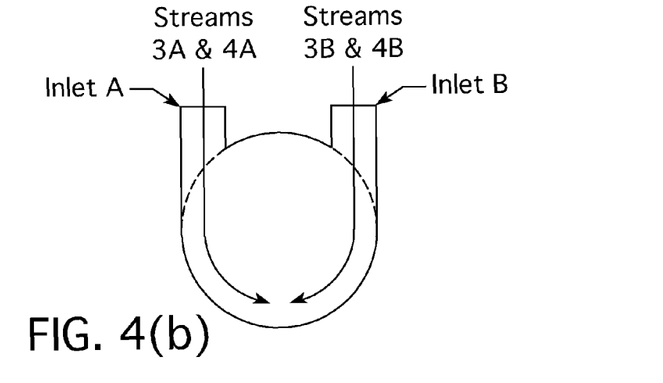
Figure 4C:
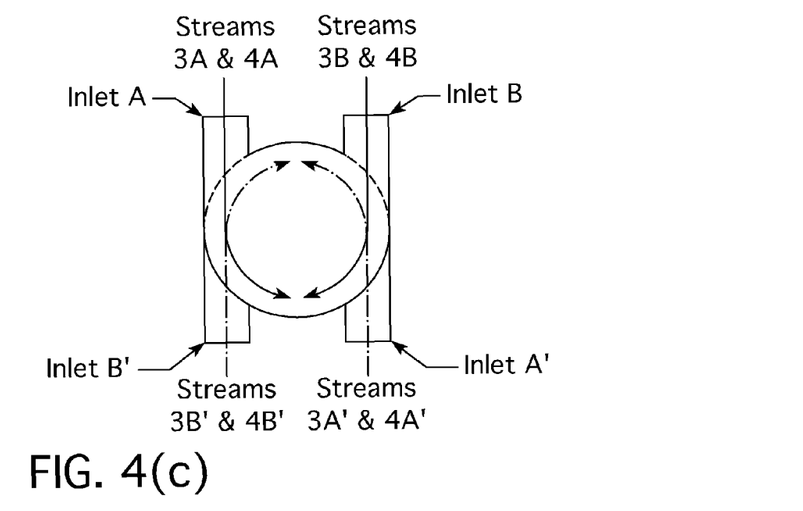

The preferred embodiment of Vessel 60 includes a well-stirred region that is created by the action of two counter-opposed gas streams (or vortices) that enter Vessel 60 tangent to the cylindrical interior at different elevations along the longitudinal axis of the vessel. The views depicted in FIGS. 4(a)-4(c) demonstrate some of the preferred arrangements of the two counter-opposed streams as shown projected in a plane orthogonal to the longitudinal axis of Vessel 60. In these views, the gas stream influent with Inlet A (i.e., the uppermost inlet) is shown imparting an anticlockwise rotation of the stream in opposition to the stream influent with Inlet B (i.e., the lower inlet) that is imparting a clockwise rotation of the stream. In FIG. 4(a) and FIG. 4(b), there are a total of two inlets to Vessel 60 in this fashion. However, it is possible to extend this layout to have multiple inlets in each plane, as is depicted in FIG. 4(c), where there are a total of four inlets. In this arrangement, there are two inlets per plane. Inlet A and Inlet A' (the uppermost inlets) both impart an anticlockwise flow to the inlet streams and Inlet B and Inlet B' (the lower inlets) both impart a clockwise flow to their inlet streams. It should also be noted that there is no special requirement that the upper inlets create an anticlockwise vortex and the lower inlets create a clockwise vortex. It is only required that the upper and lower flows have flows opposite to each other. Thus, the apparatus can be constructed in such a fashion that the inlet directions are operated vice versa, with a clockwise rotation at the topmost plant and an anticlockwise rotation at the lower plane.

The preferred embodiments of Vessel 140 (FIG. 3) can be demonstrated by commercially available designs for high-temperature separation assemblies. For example, ALB Klein's CERAFUME™ filter assemblies or Biothermica's Clinox™ sieves are both excellent examples of this art.

EXAMPLES

A number of pilot-scale trials were conducted with various molybdenum containing feedstocks to verify process performance. The pilot trials were performed with a system configuration and apparatus that included a ball mill comminution system, a loss-in-weight screw feeder for delivery of the feedstock, a combustion air delivery system, an oxygen delivery system, an entrained-flow reactor assembly consisting of a counter-rotating vortex reactor and a cyclone reactor, a high-temperature cyclone separator, a gas quench assembly, a low-temperature baghouse, and an acid gas scrubber. Provisions were present in the pilot-scale system for the collection of the a stream analogous to Product 1 (an alumina/silica rich stream discharged from the high-temperature cyclone separator, also referred to as the by-product) as well as a stream somewhat analogous to Product 2 (a molybdenum trioxide rich stream discharged from the low-temperature baghouse, also referred to herein as the BH product). The BH product in the pilot trials does not exactly replicate Product 2 since the bag house used for the pilot trials operated at temperatures lower than specified in the preferred embodiment of this invention. A summary of the feedstock compositions for each pilot trial is provided in Table 1.

TABLE 1

| | Test No. | | | | | |
|---|---|---|---|---|---|---|
| Element | 1 Element Wt % | 2 Element Wt % | 3 Element Wt % | 4 Element Wt % | 5 Element Wt % | 6 Element Wt % |
| C | 0.14% | 8.36% | 0.04% | 0.47% | 17.46% | 5.56% |
| Fe | | | | | 0.03% | 0.07% |
| Mo | 14.83% | 6.32% | 4.04% | 11.32% | 11.98% | 14.62% |
| Ni | 3.61% | 0.14% | 1.49% | 3.06% | 0.04% | 2.72% |

TABLE 1-continued

| | Test No. | | | | | |
|---|---|---|---|---|---|---|
| Element | 1 Element Wt % | 2 Element Wt % | 3 Element Wt % | 4 Element Wt % | 5 Element Wt % | 6 Element Wt % |
| P | 1.42% | 0.51% | 0.007% | 2.85% | 0.0013% | 2.56% |
| S | 0.24% | 3.49% | 0.01% | | 11.01% | 10.78% |
| Si | 0.08% | 1.54% | 0.65% | 0.81% | 0.60% | 0.22% |
| Co | | | | 0.01% | 2.66% | 0.01% |

The data displayed in Table 1 represents the weight fractions for each of the following elements: carbon, molybdenum, nickel, phosphorous, sulfur and silicon. The molybdenum concentrations of the feedstocks tested ranged from about 4% to nearly 15%. Aluminum was the primary remaining element; however, trace amounts of calcium, magnesium, sodium, potassium, iron, arsenic, barium, and vanadium were also found in some of the materials tested. Compositions of the molybdenum trioxide product samples collected during each pilot trial are presented in Table 2.

TABLE 2

| | Test No. | | | | | |
|---|---|---|---|---|---|---|
| Element | 1 Element Wt % | 2 Element Wt % | 3 Element Wt % | 4 Element Wt % | 5 Element Wt % | 6 Element Wt % |
| Al | NM | 1.60% | 2.12% | NM | NM | NM |
| C | 0.27% | 0.12% | 0.02% | 3.42% | 0.39% | 0.22% |
| Fe | NM | NM | 0.06% | | 0.05% | 0.11% |
| Mo | 58.16% | 56.96% | 28.00% | 50.73% | 59.50% | 59.96% |
| Ni | 0.20% | 0.07% | 1.39% | 0.55% | 0.18% | 0.66% |
| P | 0.005% | 0.37% | 0.05% | 0.60% | 0.10% | 1.50% |
| S | 0.11% | 0.25% | 0.03% | | 0.95% | 0.62% |
| Si | 0.70% | 0.35% | 0.06% | 0.23% | 0.06% | 0.03% |
| Co | NM | 0.13% | | 0.01% | 0.31% | 0.04% |

Table 3 summarizes for each of the pilot trials the average size and bulk density of the as-received feedstock, the as-processed feedstock, Product 1 (by-product) and Product 2 (BH product), as well as the reactor temperature at the exit of the entrained-flow reactor, the molybdenum trioxide composition in Product 2, the percent recovery of molybdenum, and the oxidant used for each test.

TABLE 3

| | | Test No. | | | | | |
|---|---|---|---|---|---|---|---|
| Process Parameter | | 1 | 2 | 3 | 4 | 5 | 6 |
| As Received Feedstock | | | | | | | |
| Average Size | Microns | 1420 | 1550 | 1330 | 425 | 1340 | 1400 |
| Bulk Density | Kg/liter | 0.863 | 1.225 | 0.6274 | 0.979 | 1.014 | 1.010 |
| As Processed Feedstock | | | | | | | |
| Average Size | Microns | 1420 | 530 | 260 | 300 | 300 | 395 |
| Bulk Density | Kg/liter | 0.863 | 1.178 | 0.7245 | 1.007 | 1.178 | 1.138 |
| By Product | | | | | | | |
| Average size | Microns | 1350 | 220 | 205 | 360 | 480 | 325 |
| Bulk Density | Kg/liter | 1.037 | 1.283 | 1.283 | 1.435 | 0.924 | 1.171 |
| BH Product | | Agglomerate | | | | Agglomerate | Agglomerate |
| Average size | Microns | 1070 | 340 | 550 | 270 | 1050 | 1050 |
| Bulk Density | Kg/liter | 0.0978 | 0.733 | 0.2642 | 0.116 | 0.113 | 0.1869 |

TABLE 3-continued

| | | Test No. | | | | | |
|---|---|---|---|---|---|---|---|
| Process Parameter | | 1 | 2 | 3 | 4 | 5 | 6 |
| Process Performance Data | | | | | | | |
| CRV Exit | Deg F. | 1728 | 2145 | 2133 | 2559 | 2695 | 2678 |
| % Mo in Feedstock | % | 14.85% | 6.32% | 4.04% | 11.32% | 11.98% | 14.62% |
| MoO3 Purity | % | 87% | 85% | 38% | 76% | 89% | 90% |
| Mo Recovery | % | 27% | 25% | 79% | 87% | 86% | 73% |
| Oxidant | air/oxygen | air | air | air | O2 Enriched | O2 Enriched | O2 Enriched |

Trial 1 was performed using the as-received feedstock having an average size of 1440 microns with air as the oxidant. The reactor temperature of this trial was relatively low (ca. 1700° F.) and the molybdenum recovery was low (ca. 27% recovery); however the weight fraction of molybdenum trioxide contained within the product was 87% (greater than required to meet the ASTM specifications for a Technical Grade A molybdenum trioxide product; i.e., 55% molybdenum or 82.5% as molybdenum trioxide). The relatively high molybdenum content of the product with the relatively low molybdenum recovery reflects a high separation efficiency of the cyclone separator when processing coarse feedstocks.

Trial 2 was performed with a feedstock that was pre-pyrolyzed at a temperature of approximately 1500° F. to remove any residual hydrocarbons. The average size of the as-received feedstock was 1550 microns, and the feedstock was comminuted in a ball mill to an average size of 530 microns. The molybdenum content of the feedstock was approximately 6%. The collected BH product contained 85% molybdenum trioxide and the molybdenum recovery was 25%. Air was used as the oxidant for Trial 2, and the entrained-flow reactor exit temperature was 2145° F.

Trial 3 was performed with an off-specification nickel/molybdenum catalyst. The material was found to be much more friable as compared to the other feedstocks tested. The as-processed feedstock had an average size of 260 microns. The molybdenum content in this material was determined to be 4%, and is the lowest of the feedstocks tested in the pilot trials. Air was used as the oxidant, and the entrained-flow reactor exit temperature was 2133° F. The weight fraction of the molybdenum trioxide in the BH product was found to be only 38%; however, the molybdenum recovery increased to 79%, suggesting that higher molybdenum recovery could be achieved with smaller-sized feedstocks. The lower weight fraction of the molybdenum trioxide product for this test is attributed to the low concentration of molybdenum in the feedstock and a decrease in cyclone separator efficiency when processing finer-sized feedstocks. Thus there is tradeoff between achieving a greater fraction of molybdenum trioxide in the product and high molybdenum recovery yields.

The next series of pilot trials (i.e., Tests 4, 5, & 6) were performed using oxygen enriched air as the oxidant, and with an entrained-flow reactor exit temperatures in excess of 2500° F. The primary objective of these tests was to determine the effect of reactor temperature on molybdenum recovery.

Trial 4 was performed with catalyst reconditioning fines. As a result the carbon content was relatively low (less than 0.5%). The molybdenum content was approximately 11% and the nickel content was approximately 3%. This feedstock contained the highest phosphorous levels of all of the pilot trials (i.e., 2.9%). The average size of the as-processed feedstock was approximately 300 microns. Oxygen enriched air was used as the oxidant and the entrained-flow reactor exit temperature was 2559° F. The molybdenum recovery increased to 87% and the weight fraction of molybdenum trioxide contained in the BH product was 76%. This test indicates that higher levels of molybdenum recovery can be achieved under an oxidizing environment with elevated reactor temperatures.

Trial 5 was performed with a Co/Mo spent catalyst obtained directly from a petroleum refiner. The carbon and sulfur content of the feedstock was the highest processed in the pilot trials, having a carbon content of 17.5% and a sulfur content of 11.0%. The cobalt content of the as processed feedstock was 2.7%, and the molybdenum content was about 12%. The comminuted feedstock average size was 300 microns. Oxygen enriched air was used as the feedstock and this test had the highest entrained-flow reactor exit temperature (2695° F.) of the pilot trials. The molybdenum recovery was 86% and the molybdenum trioxide content of the BH product was 89%. This test was near preferred conditions for both molybdenum recovery and molybdenum trioxide content of the product; however, it is projected that higher molybdenum recovery levels can be achieved with increased entrained-flow reactor residence time, increased operating temperature and increased oxidant concentration.

Trial 6 was performed with a Ni/Mo spent catalyst obtained directly from a petroleum refiner. The operating conditions were similar to that of Trial 5. The as-processed feedstock included 5.6% carbon, 14.6% molybdenum, 2.7% nickel, 2.6% phosphorous and 10.8% sulfur. This feedstock demonstrated either a greater physical hardness or toughness as compared to the feedstock than the Ni/Co material processed in Trial 5, and the average size of the as-processed feedstock was 390 microns. The molybdenum trioxide content of the BH product was found to be greater than 90% and the molybdenum recovery was 73%. The reduced molybdenum recovery is attributed to the larger feedstock size and perhaps due to the existence of different molybdenum species in the spent catalysts.

Conclusions derived from the examples described above are as follows:

For the disclosed invention, molybdenum recovery levels increase with increasing operating temperature. A minimum operating temperature of 2100° F. is preferred. Molybdenum trioxide content in the product is dependent on the level of molybdenum contained in the feedstock, the amount of $MoO_3$ sublimed and the separation efficiency of the high temperature cyclone. The separation efficiency of the cyclone separator, in turn, is dependent on the particle size distribution of the feedstock. Since cyclone separation efficiency decreases rapidly for particles less than 20-40 microns, it is desirable to reduce the size of the feedstock only moderately, such that effective molybdenum recovery can be achieved, but not at the expense of a decrease in molybdenum in the product due to an increase in residue carry-over from the cyclone separator. Based on the pilot plant data, a preferred average size is in the range of about 200-400 microns with a minimum of fines less than 40 microns.

The use of oxygen and a corresponding increase in operating temperature, significantly improves molybdenum recovery. The use of high-purity oxygen with excess oxygen concentrations above stoichiometric concentrations improves molybdenum recovery levels of the invention.

Although this invention is described in this work in conjunction with its preferred embodiments, it is to be understood that modifications, variations, and equivalently-functional equipment may be utilized, substituted, or resorted to, without departing from the spirit and the scope of this invention, as those skilled in this art will understand. Such modifications, variations, and equivalent equipment are considered in the purview and scope of this invention and the appended claims.

What is claimed is:

1. A method for the recovery of molybdenum from feedstock containing molybdenum comprising:
    heating and oxidizing the feedstock in a counter-rotating-vortex, entrained-flow reactor at a sufficiently high temperature within an oxidizing atmosphere to effect the oxidation of molybdenum species and sublimation of molybdenum trioxide;
    separating non-volatile materials from a vapor species in the effluent stream from the counter-rotating-vortex entrained-flow reactor with a high-temperature cyclone separator, yielding two separate streams with the first stream being non-volatile materials separated by the cyclone separator from a second stream which is a gaseous stream passing through the cyclone separator,
    said first stream yielding a first product comprised of non-volatile materials;
    quenching said second stream to yield a second product which is condensed molybdenum trioxide powder; and
    separating the second product from the gaseous stream.

2. The method of claim 1 including
    employing spent catalyst materials as said feedstock.

3. The method of claim 1 including
    effecting said quenching at a temperature of about 1000° F. to 1350° F.

4. The method of claim 1 including
    effecting said separation of condensed molybdenum trioxide from said gaseous stream in a high-temperature filter.

5. The method of claim 2 including
    employing as said spent catalyst material containing, in addition to said molybdenum, at least one compound containing a material selected from the group consisting of alumina, silica, vanadium, nickel, cobalt, tungsten, sulfur, carbon, phosphorus, and arsenic.

6. The method of claim 2 where the spent catalyst materials influent to the entrained-flow reactor are comminuted to a particle size distribution suitable for the rapid heating and oxidation of the spent catalyst materials in the entrained-flow reactor.

7. The method of claim 6 including
    employing, as said comminuted spent catalyst materials, materials having an average particle size of about 200 to 400 microns.

8. The method of claim 3 including
    effecting said heating and oxidizing at a temperature of about 2500° F. to 2900° F.

9. The method of claim 8 including
    employing a gas residence time in said counter-rotating-vortex entrained-flow reactor of at least 100 milliseconds.

10. The method of claim 1 including
    employing, as said feedstock, at least one material selected from the group consisting of molybdenum-containing ores and molybdenum-containing ore concentrates.

11. The method of claim 10 including
    said molybdenum-containing ores/ore concentrates are selected from the group consisting of molybdenite, scheelite, powellite, tungstenite, and wolframite.

12. The method of claim 1 including
    employing, the oxygen-enriched air introduced into said entrained-flow reactor in effecting said oxidizing of the feedstock.

13. The method of claim 1 including
    employing, the high-purity oxygen introduced into said entrained-flow reactor, in effecting said oxidizing of the feedstock.

14. The method of claim 1 including
    employing, as said feedstock materials containing molybdenum and tungsten.

15. The method of claim 1 including
    employing air introduced into said entrained flow reactor in effecting said oxidizing of the feedstock.

16. The method of claim 1 including
    effecting said heating and oxidizing step at a temperature of about 2100° F. to 2900° F.

17. The method of claim 1 including
    introducing materials exiting said counter-rotating-vortex entrained flow reactor into a substantially horizontal cyclone entrained flow reactor to provide further oxidation and sublimation of the molybdenum oxide.

18. The method of claim 1 including
    said quenching of said second stream is effected at temperatures sufficiently low to effect condensation of the molybdenum oxide vapor fraction of said gaseous stream, but at temperatures sufficiently high to minimize the condensation of other vapor phase species exiting the cyclone separator.

19. The method of claim 18 including
    said separating of said second product from the gaseous stream is accomplished by employing a high-temperature filter assembly which permits passage of the yet gaseous oxide vapor fraction of said gaseous stream through the filter assembly.

20. The method of claim 1 including
    said first product is composed of at least one material selected from the group consisting of an alumina-rich material and a silica-rich material.

21. The method of claim 1 including
    employing the comminution of said spent catalyst materials influent to the said counter-rotating-vortex, entrained-flow reactor where the comminuted particle size distribution is sufficiently small to promote the rapid heating and oxidation of the said spent catalyst materials; and said comminuted particle size distribution is sufficiently large to efficiently collect said first product in said high-temperature cyclone separator.

* * * * *

UNITED STATES PATENT AND TRADEMARK OFFICE
CERTIFICATE OF CORRECTION

| | | |
|---|---|---|
| PATENT NO. | : 7,854,908 B2 | Page 1 of 1 |
| APPLICATION NO. | : 12/195042 | |
| DATED | : December 21, 2010 | |
| INVENTOR(S) | : James G. Hnat et al. | |

It is certified that error appears in the above-identified patent and that said Letters Patent is hereby corrected as shown below:

Column 1, line 58, "presence" should read --the presence--.
Column 3, line 8, "employ of this type" should read --employ this type--.
Column 3, line 30, "both a" should read --both--.
Column 5, line 27, "a residence" should read --of a residence--.
Column 6, line 31, "molybednum" should read --molybdenum--.
Column 9, line 15, "with vessel" should read --within the vessel--.
Column 9, line 32, "as it typical" should read --as is typical--.
Column 12, line 14, "represents" should read --represent--.
Column 13, line 52, "there is tradeoff" should read --there is a trade-off--.

Signed and Sealed this
Twenty-seventh Day of December, 2011

David J. Kappos
*Director of the United States Patent and Trademark Office*